United States Patent
Chen et al.

(10) Patent No.: US 9,646,427 B2
(45) Date of Patent: May 9, 2017

(54) SYSTEM FOR DETECTING THE OPERATIONAL STATUS OF A VEHICLE USING A HANDHELD COMMUNICATION DEVICE

(71) Applicant: Innova Electronics, Inc., Irvine, CA (US)

(72) Inventors: Ieon C. Chen, Laguna Hills, CA (US); Keith Andreasen, Garden Grove, CA (US)

(73) Assignee: INNOVA ELECTRONICS CORPORATION, Irvine, CA (US)

( * ) Notice: Subject to any disclaimer, the term of this patent is extended or adjusted under 35 U.S.C. 154(b) by 106 days.

(21) Appl. No.: 14/509,874

(22) Filed: Oct. 8, 2014

(65) Prior Publication Data

US 2016/0104328 A1 Apr. 14, 2016

(51) Int. Cl.
| | | |
|---|---|---|
| G01M 17/00 | (2006.01) | |
| G06F 7/00 | (2006.01) | |
| G06F 19/00 | (2011.01) | |
| G07C 5/00 | (2006.01) | |
| G07C 5/08 | (2006.01) | |
| G01C 21/34 | (2006.01) | |

(52) U.S. Cl.
CPC ........... *G07C 5/008* (2013.01); *G07C 5/0858* (2013.01); *G01C 21/34* (2013.01); *G01C 21/3415* (2013.01)

(58) Field of Classification Search
CPC ....... G06F 17/00; G07C 5/008; G07C 5/0808; G07C 2205/02; G01C 21/34; G01C 21/3415

USPC .................................. 701/29.4, 33; 340/901
See application file for complete search history.

(56) References Cited

U.S. PATENT DOCUMENTS

| | | |
|---|---|---|
| D334,560 S | 4/1993 | Wilson |
| 5,347,211 A | 9/1994 | Jakubowski |
| D377,622 S | 1/1997 | Chen |
| 5,635,841 A | 6/1997 | Taylor |
| 5,758,300 A | 5/1998 | Abe |
| 5,767,681 A | 6/1998 | Huang |
| 5,809,437 A | 9/1998 | Breed |
| 5,859,628 A | 1/1999 | Ross et al. |
| 5,884,202 A | 3/1999 | Arjomand |
| 6,000,413 A | 12/1999 | Chen |
| 6,055,468 A | 4/2000 | Kaman et al. |
| 6,094,609 A | 7/2000 | Arjomand |

(Continued)

FOREIGN PATENT DOCUMENTS

WO    WO 0186576    11/2001

*Primary Examiner* — Nicholas Kiswanto
*Assistant Examiner* — Rachid Bendidi
(74) *Attorney, Agent, or Firm* — Stetina Brunda Garred and Brucker

(57) ABSTRACT

A system which utilizes the on-board capabilities of handheld communication devices, such as smartphones, tablet computers and the like, to detect the operational status of a vehicle, such as the engine being ON, the engine idling, the vehicle moving, etc. The detected operational state may be desirable for monitoring operation of the vehicle, such as fleet management systems, wherein the duration and location of idling are of particular interest. The detected operational state may also be useful for controlling functionality on the handheld communication device, such as disabling texting or other manually operated functions when the vehicle is in motion.

20 Claims, 7 Drawing Sheets

(56) References Cited

U.S. PATENT DOCUMENTS

| | | |
|---|---|---|
| 6,169,943 B1 | 1/2001 | Simon et al. |
| 6,225,898 B1 | 5/2001 | Kamiya et al. |
| 6,263,268 B1 | 7/2001 | Nathanson |
| 6,389,337 B1 | 5/2002 | Kolls |
| 6,438,471 B1 | 8/2002 | Katagishi et al. |
| 6,499,385 B2 | 12/2002 | Protti |
| 6,535,112 B1 | 3/2003 | Rothschink |
| 6,535,131 B1 * | 3/2003 | Bar-Shalom ......... A01K 11/008 340/573.1 |
| 6,587,768 B2 | 7/2003 | Chene et al. |
| 6,611,740 B2 | 8/2003 | Lowrey et al. |
| 6,650,318 B1 | 11/2003 | Arnon |
| 6,718,425 B1 | 4/2004 | Pajakowski et al. |
| 6,732,031 B1 | 5/2004 | Lightner et al. |
| 6,807,469 B2 | 10/2004 | Funkhouser et al. |
| 6,836,708 B2 | 12/2004 | Tripathi |
| 6,847,916 B1 | 1/2005 | Ying |
| 6,868,369 B2 | 3/2005 | Huang |
| 6,925,368 B2 | 8/2005 | Funkhouser et al. |
| 6,940,270 B2 | 9/2005 | Chen |
| D510,287 S | 10/2005 | Chen |
| 6,957,133 B1 | 10/2005 | Hunt et al. |
| 6,968,733 B2 | 11/2005 | Andreasen |
| 7,030,742 B2 | 4/2006 | Treadway |
| 7,085,680 B2 | 8/2006 | Huang |
| 7,116,216 B2 | 10/2006 | Andreasen |
| 7,117,149 B1 * | 10/2006 | Zakarauskas ........... G10L 17/26 704/226 |
| 7,209,813 B2 | 4/2007 | Namaky |
| RE39,619 E | 5/2007 | Andreasen |
| D545,223 S | 6/2007 | Chen |
| D558,621 S | 1/2008 | Rich |
| D559,137 S | 1/2008 | Protti |
| D560,129 S | 1/2008 | Rich |
| D560,527 S | 1/2008 | Rich |
| 7,325,775 B2 | 2/2008 | Chen |
| D563,249 S | 3/2008 | Chen |
| 7,363,149 B2 | 4/2008 | Klausner et al. |
| D569,280 S | 5/2008 | Chen |
| 7,376,497 B2 | 5/2008 | Chen |
| D571,241 S | 6/2008 | Andreasen |
| 7,437,227 B2 | 10/2008 | Andreasen |
| D581,822 S | 12/2008 | Madison |
| 7,464,000 B2 | 12/2008 | Huang |
| D590,387 S | 4/2009 | Chen |
| 7,520,668 B2 | 4/2009 | Chen |
| RE40,798 E | 6/2009 | Chen |
| RE40,799 E | 6/2009 | Chen |
| 7,603,293 B2 | 10/2009 | Chenn |
| 7,620,484 B1 | 11/2009 | Chen |
| D610,586 S | 2/2010 | Chen |
| 7,734,390 B2 | 6/2010 | Chen |
| 7,778,750 B2 | 8/2010 | Knight et al. |
| D624,446 S | 9/2010 | Chen |
| D624,838 S | 10/2010 | Chen |
| D625,209 S | 10/2010 | Chen |
| D625,210 S | 10/2010 | Chen |
| D625,634 S | 10/2010 | Chen |
| 7,904,219 B1 | 3/2011 | Lowrey et al. |
| 7,974,750 B2 | 7/2011 | Namaky |
| 8,019,503 B2 | 9/2011 | Andreasen |
| 8,024,083 B2 | 9/2011 | Chenn |
| D646,188 S | 10/2011 | Chen |
| D646,599 S | 10/2011 | Chen |
| 8,032,419 B2 | 10/2011 | Chenn |
| 8,068,951 B2 | 11/2011 | Chen et al. |
| 8,301,329 B2 | 10/2012 | Andreasen |
| 8,306,687 B2 | 11/2012 | Chen |
| 8,370,018 B2 | 2/2013 | Andreasen et al. |
| 8,457,323 B2 | 6/2013 | Palmestal |
| 8,509,986 B1 | 8/2013 | Chen |
| 8,570,168 B2 | 10/2013 | Logan et al. |
| 8,620,518 B2 | 12/2013 | Bradley et al. |
| 8,630,765 B2 | 1/2014 | Chen |
| 8,825,271 B2 | 9/2014 | Chen |
| 8,831,814 B2 | 9/2014 | Chen |
| 8,855,621 B2 | 10/2014 | Chen |
| 8,862,117 B2 | 10/2014 | Chen |
| 8,880,274 B2 | 11/2014 | Chen |
| 8,909,416 B2 | 12/2014 | Chen et al. |
| 9,089,123 B1 * | 7/2015 | Thomas ................. A01M 29/16 |
| 2003/0171111 A1 | 9/2003 | Clark |
| 2004/0110472 A1 | 6/2004 | Witkowski |
| 2006/0066439 A1 * | 3/2006 | Keeling ................ B60R 25/246 340/5.61 |
| 2006/0135215 A1 * | 6/2006 | Chengalvarayan ... H04M 1/271 455/569.2 |
| 2008/0001708 A1 * | 1/2008 | Nakashima ......... B60R 25/2009 340/5.72 |
| 2008/0015748 A1 * | 1/2008 | Nagy .................... G07C 5/008 701/31.4 |
| 2008/0161988 A1 * | 7/2008 | Oesterling ............. G07C 5/008 701/31.4 |
| 2009/0192688 A1 * | 7/2009 | Padmanabhan ...... G08G 1/0104 701/70 |
| 2009/0276115 A1 | 11/2009 | Chen |
| 2010/0211387 A1 * | 8/2010 | Chen ...................... G10L 25/78 704/226 |
| 2011/0224866 A1 | 9/2011 | Chen |
| 2011/0264322 A1 | 10/2011 | Chen |
| 2012/0215398 A1 | 8/2012 | Chen |
| 2013/0099941 A1 * | 4/2013 | Jana ..................... H04W 4/023 340/905 |
| 2013/0261846 A1 | 10/2013 | McQuade et al. |
| 2013/0261874 A1 | 10/2013 | McQuade et al. |
| 2013/0261907 A1 | 10/2013 | McQuade et al. |
| 2013/0261939 A1 | 10/2013 | McQuade et al. |
| 2013/0261942 A1 | 10/2013 | McQuade et al. |
| 2013/0297175 A1 * | 11/2013 | Davidson ............... G07B 15/06 701/99 |
| 2013/0304347 A1 | 11/2013 | Davidson |
| 2013/0304348 A1 | 11/2013 | Davidson et al. |
| 2013/0304349 A1 | 11/2013 | Davidson |
| 2014/0032062 A1 | 1/2014 | Baer et al. |
| 2014/0046800 A1 | 2/2014 | Chen |
| 2014/0052328 A1 | 2/2014 | Nguyen |
| 2014/0055276 A1 | 2/2014 | Logan et al. |
| 2014/0195106 A1 * | 7/2014 | McQuade ............ G07C 5/0841 701/33.9 |
| 2014/0333425 A1 * | 11/2014 | Giraud ................ H04W 84/005 340/438 |
| 2015/0088792 A1 * | 3/2015 | O'Neill .................... H04L 67/10 706/12 |
| 2015/0154711 A1 * | 6/2015 | Christopulos ...... G06Q 30/0201 705/7.29 |
| 2015/0323324 A1 * | 11/2015 | Katsman ................. G01S 19/13 701/490 |
| 2015/0332409 A1 * | 11/2015 | Menon ................... G07C 5/008 705/4 |

* cited by examiner

|  | Microphones | Accelerometer | GPS | Short-Range Communication Module | Rf |
|---|---|---|---|---|---|
| Entry | ✓ |  | ✓ | ✓ | ✓ |
| Engine Start (Surge) | ✓ | ✓ |  | ✓ | ✓ |
| Key On Engine Running | ✓ | ✓ |  | ✓ | ✓ |
| Moving | ✓ | ✓ | ✓ | ✓ | ✓ |
| Key On Engine Off | ✓ | ✓ | ✓ | ✓ | ✓ |

*Fig. 1A*

SYSTEM FOR DETECTING THE OPERATIONAL STATUS OF A VEHICLE USING A HANDHELD COMMUNICATION DEVICE

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention generally relates to a detection system for use with a vehicle, and more specifically, to a system which utilizes the onboard hardware of a handheld communication device, such as a smartphone, to detect various milestones associated with a typical driving experience.

A typical driving experience generally involves several milestones, such as getting into a vehicle, starting the engine, placing the transmission in drive, riding in the moving vehicle, placing the transmission in park, turning the engine OFF, and exiting the vehicle. Progression through the milestones associated with a driving experience may have several consequences or may impact several related systems or devices.

One particular system which may be directly impacted by a driving experience of a particular driver is a corresponding fleet management system. Along these lines, a fleet manager may have an interest in detecting when one of the fleet's vehicles is idling, where the idling takes place, and how long the vehicle idles. For instance, if idling is detected for an extended period of time, the fleet manager may want to check-in with the driver to see if the driver is distracted by non-work related activities, or whether the driver is encountering an unexpected problem. For instance, the idling may be indicative of a traffic backup, which may require rerouting for related fleet vehicles.

Along these lines, fleet monitoring units are available, which comprise a dongle which is plug-connectable into a vehicle for receiving operational information therefrom. Such fleet monitoring units are dedicated units, which oftentimes require an initial acquisition fee, as well as a monthly service fee for enabling wireless communication between the detection unit and the fleet management facility. If each vehicle is equipped with a fleet monitoring unit, the aggregated cost of the overall fleet monitoring system may be significant.

Another commonly used device which is impacted by various milestones associated with a typical driving experience is the smartphone. Most smartphones are very powerful devices capable of performing several different functionalities. For instance, a smartphone may be capable of running several different manually-operated functionalities, such as texting, emailing, calendaring, note-taking, games, social networking, etc. Smartphones may also be capable of performing several functions which require minimal manual input, such talking over the phone, streaming music, generating acoustic alerts, etc.

Many jurisdictions have implemented laws which limit certain functions on a smartphone when the vehicle is being driven. For instance, several states have created laws which prohibit texting and driving. Although drivers tend to be aware of such laws, drivers oftentimes do not abide by the law, as drivers oftentimes execute such manually operated functions out of habit.

In view of the foregoing, it is clear that achieving various milestones during a driving experience has a significant impact on various related systems, such as fleet management and smartphones. As such, there is an apparent need in the art for easily detecting the various milestones associated with the driving experience.

BRIEF SUMMARY

According to various aspects of the present invention, there is provided a system which utilizes the on-board capabilities of conventional handheld communication devices, e.g., smartphones, tablet computers and the like, for sensory automotive analytics, e.g., to detect the operational status of a vehicle, such as the engine being started, the engine idling (the engine being ON and the vehicle being stationary), the vehicle moving (with the engine being ON), the engine being turned OFF, etc. The detected operational state may be desirable for monitoring operation of the vehicle, wherein the duration and location of idling are of particular interest, such as in fleet management systems. The detected operational state may also be useful for controlling functionality on the handheld communication device, such as disabling texting or other manually operated functions when the vehicle is in motion.

According to one embodiment, there is provided a set of computer executable instructions downloadable onto a handheld communication device for detecting an operational status of a vehicle. The handheld communication device includes operational status detection hardware. The set of computer executable instructions further comprises an entry detection module configured to detect entry of the handheld communication device into an area associated with the vehicle. A vehicle operation module is in communication with the entry detection module and is configured to activate the operational status detection hardware in the handheld communication device and detect the operational status of the vehicle using the activated operational status detection hardware.

The entry detection module may configure the handheld communication device to detect entry of the handheld communication device into the area associated with the vehicle based on position data received by the handheld communication device. The handheld communication device may compare the position data received by the handheld communication device with position data stored on the handheld communication device to determine entry of the handheld communication device into the area associated with the vehicle.

The entry detection module may configure the handheld communication device to detect entry of the handheld communication device into an area associated with the vehicle based on a wireless signal generated by one of the vehicle and a wireless vehicle access device.

The entry detection module may configure the handheld communication device to detect entry of the handheld communication device into an area associated with the vehicle based on signals received by a microphone located on the handheld communication device.

The entry detection module may configure the handheld communication device to detect entry of the handheld communication device into an area associated with the vehicle based on signals received by an accelerometer located on the handheld communication device.

The vehicle operation module may configure the handheld communication device to detect idling of the vehicle based on signals received by an accelerometer and a microphone, both being located on the handheld communication device.

The vehicle operation module may configure the handheld communication device to detect the starting of the engine. The vehicle operation module may also configure the handheld communication device to detect engine idling. The vehicle operation module may configure the handheld communication device to measure an idling time corresponding to duration of vehicle idling, compare the measured idling time to a prescribed idling time threshold, and generate an alert signal when the measured idling time exceeds the prescribed idling time threshold.

The vehicle operation module may configure the handheld communication device to detect a vehicle engine being ON, which may include starting of the engine, engine idling, or the vehicle moving. A manual function control module may be in communication with the vehicle operation module and configured to disable at least one manually operated function of the handheld communication device in response to detection of the vehicle engine being ON. The vehicle operation module may configure the handheld communication device to detect a vehicle engine transitioning from being ON to being OFF. The manual function control module may enable the at least one manually operated function of the handheld communication device in response to detection of the vehicle engine transitioning from being ON to being OFF.

The manual function control module may transition the handheld communication device into a preset limited operation mode when the vehicle is detected as being ON.

According to another embodiment, there is provided a set of computer executable instructions downloadable onto a handheld communication device for detecting operational status of a vehicle. The set of computer executable instructions configure the handheld communication device to: receive acoustic signals from a microphone located on the handheld communication device; receive acceleration signals from an accelerometer located on the handheld communication device; and compare the received acoustic signals and acceleration signals with stored acoustic and acceleration signals corresponding to vehicle idling of a predetermined vehicle to detect vehicle idling.

The set of computer executable instructions may configure the handheld communication device to communicate an alert signal to a remote server.

The set of computer executable instructions may further configure the handheld communication device to communicate vehicle idling information to a routing module. The routing module may be configured to calculate navigational directions based on received vehicle idling information.

The computer executable instructions may configure the handheld communication device to detect the vehicle engine being started and/or running based on an electrical signal received by the handheld communication device.

The computer executable instructions may configure the handheld communication device to detect the vehicle engine being started and/or running at least partially based on data received from the microphone.

The computer executable instructions may configure the handheld communication device to detect the vehicle engine being started and/or running at least partially based on data received from the accelerometer.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1A is a table illustrating use of resources on a conventional smartphone for detecting various operational milestones associated with driving a vehicle;

DETAILED DESCRIPTION

Figure 1:
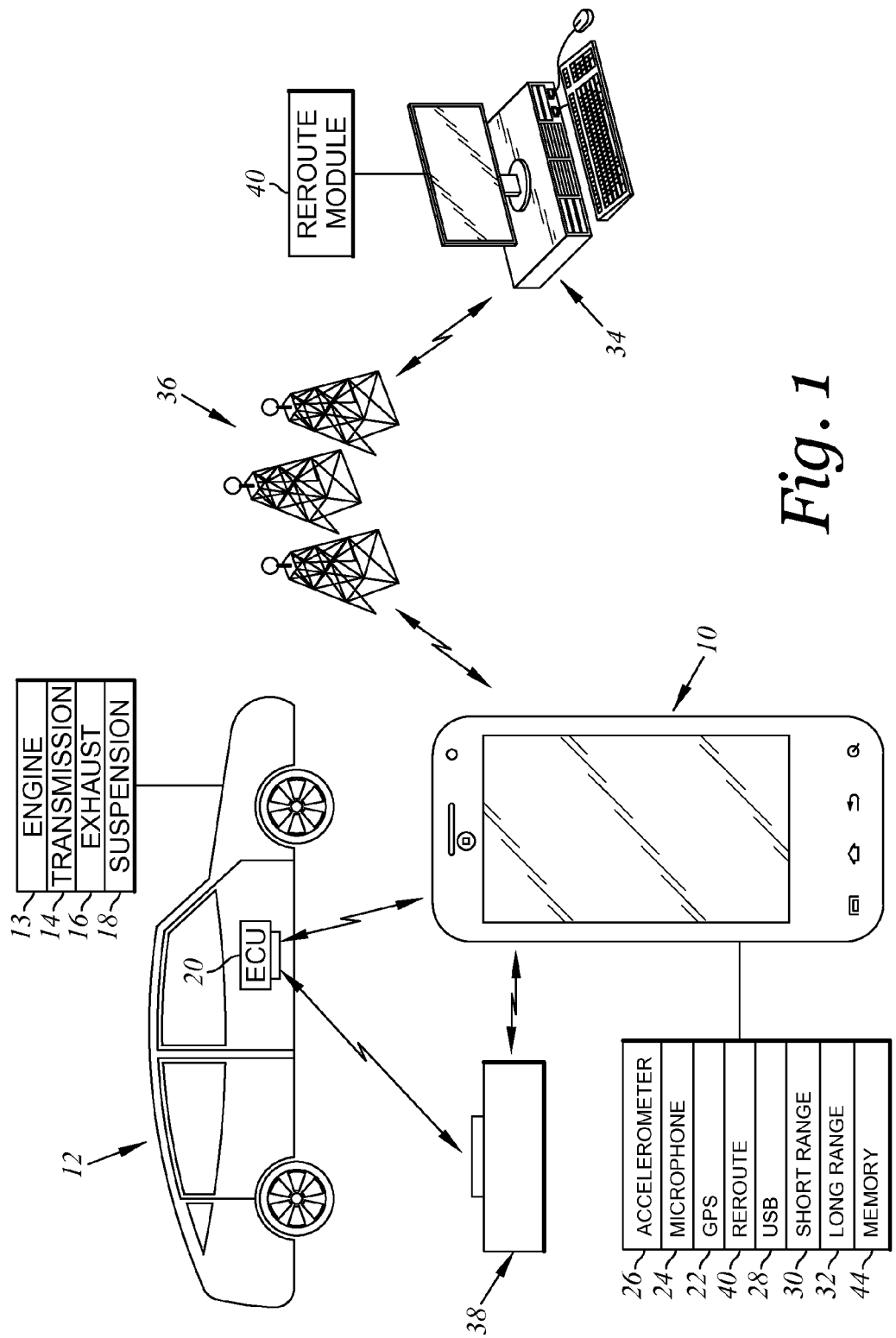
FIG. 1 is a schematic view of a vehicle milestone detection system.

Referring now to the drawings, wherein in the showings are for the purposes of illustrating a preferred embodiment of the present invention only, and are not for the purposes of limiting the same, there is depicted a system which utilizes the capabilities of a conventional smartphone 10 to detect and monitor various aspects of a driving experience. Various aspects of the invention are directed toward utilizing the smartphone's internal peripherals to sense its whereabouts by listening and feeling the unique sounds and vibrations of a vehicle's structural and internal combustion or electric driven motors and engines, thereby intuitively monitoring and/or alerting responsible parties. For instance, the smartphone 10 may detect entry into the vehicle 12, starting the vehicle 12 (e.g., turning the engine ON), movement of the vehicle 12 while the engine is ON, idling of the vehicle 12, turning the vehicle OFF (e.g., turning the engine OFF), and exiting out of the vehicle 12. The smartphone 10 may be configured to keep track of the time or duration in which the vehicle 12 remains in each stage or milestone of the driving experience, such as how long a vehicle 12 remains in an idling state. The smartphone 10 may also be configured to dramatically adapt the functionality of the smartphone 10 depending on the operational state of the vehicle 12. For instance, if the smartphone 10 detects that the vehicle 12 is ON (e.g., the vehicle has been started, or is idling, or is moving), the smartphone 10 may automatically disable texting functionality, or other manually operated functionality of the smartphone 10. In this respect, the system is a powerful resource and also enhances the safety of the driving experience by automatically tailoring the functionality of the smartphone 10 so as not to interfere or distract a driver.

Various aspects of the present invention recognize that a conventional vehicle 12 includes an engine 13 transmission 14, an exhaust 16, a suspension 18, and one or more electronic control unit(s) (ECU) 20, which generates unique outputs when the vehicle 12 is operating. The engine 13, transmission 14, exhaust 16, suspension 18, and other mechanical systems in the vehicle 12 typically generate unique orders of sound and vibration, which are known as tonal noise. Furthermore, the ECU 20 and other electrical systems in the vehicle 12 typically generate electrical signals during operation of the vehicle 12. Certain aspects of the present invention are directed toward detecting the noise and/or electrical signals generated by the vehicle 12 during operation thereof for detecting the operational state of the vehicle 12.

Referring to FIG. 1, a conventional smartphone 10 is a handheld communication device which typically includes a GPS module 22, a microphone 24, an accelerometer 26, and electrical input 28, such as a USB port, or micro-USB port, or the like. The smartphone 10 also includes short range and long range communications modules 30, 32 for transmitting communications to a remote device, such as another smartphone, a remote server 34, a telecommunications tower 36 or satellite. The short range communication module 30 may be adapted to communicate via a BLUETOOTH protocol, Radio Frequency (RF) protocol, or other short range communication protocols known in the art. The long range communication module 32 may be adapted to communicate via a cellular communications network, etc. The smartphone 10 additionally includes a local memory 44 for loading and running one or more smartphone applications. Although the following discussion will focus on a smartphone 10, it is also contemplated that the term "handheld communication device" applies to a broad class of devices which include, but are not limited to, tablet computers, smart watches, PDAs or other devices known or later developed in the art.

FIG. 1A is a table which illustrates which resources on a conventional smartphone 10 may be used in one embodiment of the invention to detect various milestones that occur during a typical driving experience, including entry of the vehicle, starting the engine (i.e., turning the engine ON), vehicle idling (i.e., key on engine running), movement of the vehicle, and key on engine OFF.

Figure 2:
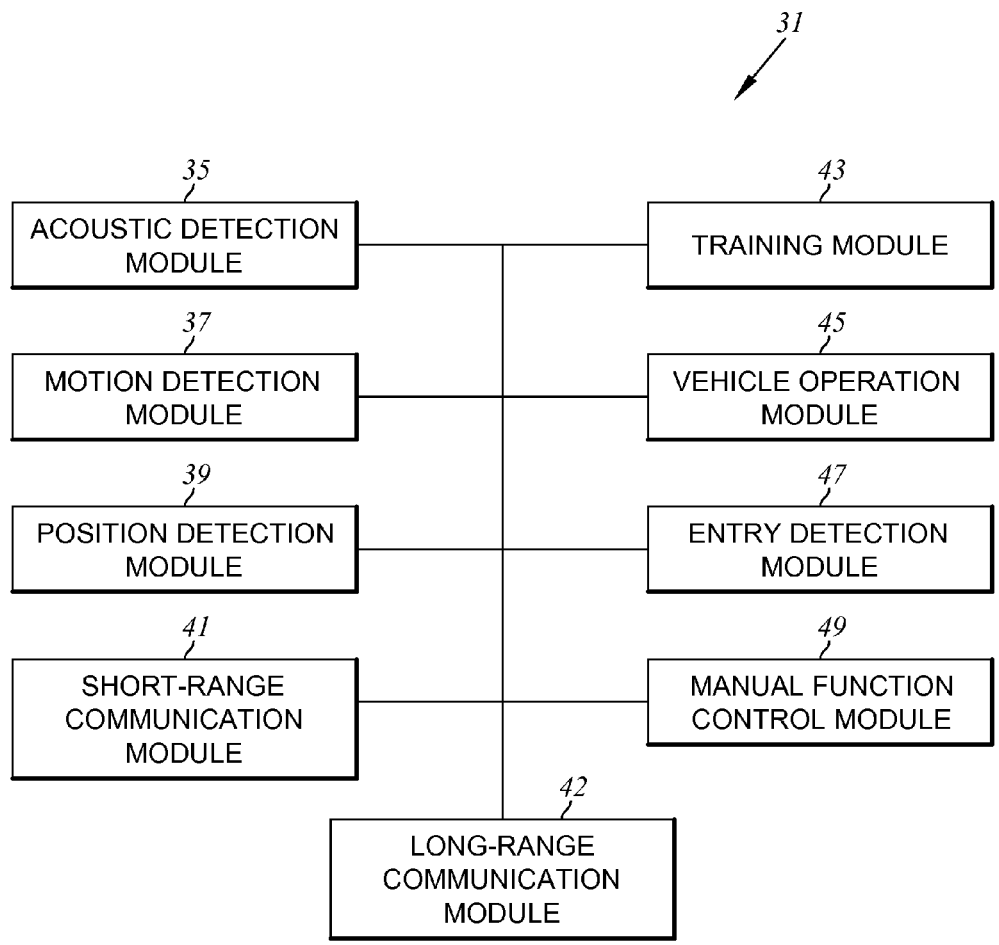
FIG. 2 is a schematic diagram of a smartphone application downloadable on the smartphone.

According to one aspect of the invention, the smartphone 10 is capable of executing or running at least one smartphone application 31 (i.e. smartphone app, see FIG. 2) which includes a set of computer executable instructions compatible with the smartphone. As will be described in more detail below, various aspects of the present invention are directed toward a smartphone app 31 which configures the smartphone 10 to execute instructions set forth in the app 31. As such, the smartphone app 31 generally includes an acoustic detection module 35, a motion detection module 37, a position detection module 39, a short-range communication module 41, a long-range communication module 42, a training module 43, a vehicle operation module 45, an entry detection module 47, and a manual function control module 49.

Figure 4:
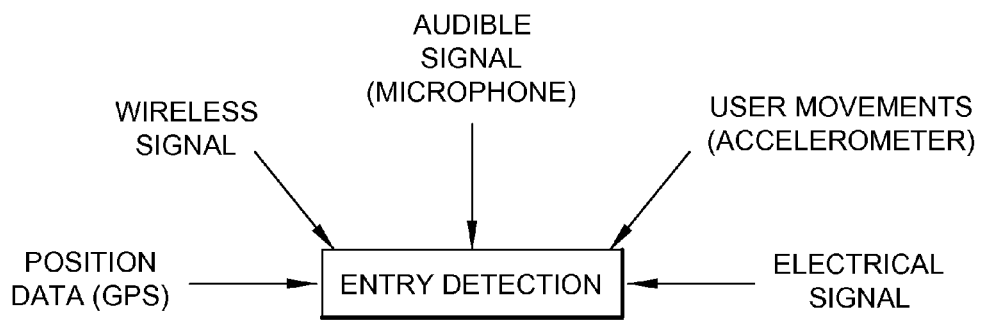
FIG. 4 is a schematic diagram illustrating various inputs which may be used for detecting entry of a smartphone into an area associated with a vehicle.

The beginning of almost any driving experience includes entry of the driver into the vehicle. Therefore, according to one embodiment and referring now to FIGS. 4 and 5, the smartphone app 31 configures the smartphone 10 to detect entry of the smartphone 10 into an area associated the vehicle 12. As used herein, an "area associated with the vehicle" may refer to an area surrounding the vehicle 12, or an area contained within the vehicle 12, such as the area near the driver's seat. The area associated with the vehicle 12 may be associated with a virtual fence defined by a signal generated by the vehicle 12, a signal generated by a remote access device (e.g., key fob), or controlled by the smartphone 10.

Detection of entry into the area associated with the vehicle 12 may be achieved by using resources that are local to the smartphone 10. For instance, the smartphone's microphone 24 may be used to detect the sound of the door opening and closing. The acoustic detection module 35 and entry detection module 47 of the smartphone app 31 may configure the microphone 24 to perform such detection of sound associated with entry into the vehicle 12. The sound associated with the entry into the vehicle 12 may be programmed into the smartphone 10 during the smartphone's initial setup process, wherein the microphone 24 records the user opening and closing the door on a specific vehicle 12. After setup, the microphone 24 may detect that noise and compare the detected noise with the stored recording to determine vehicle entry. Along these lines, the training module 43 enables the smartphone 10 to be "trained" to detect the sound associated with entering the vehicle 12. In this respect, the training module 43 may be in operative communication with the microphone 24, as well as local processing and storage hardware located on the smartphone 10. When the smartphone 10 is in a "training mode," the smartphone 10 is programmed to focus on obtaining data which will be set as a baseline and stored on the smartphone 10. After the smartphone 10 has been trained, data is collected by the microphone 24 and compared to the baseline data during subsequent entries into the vehicle 12.

Figure 5:
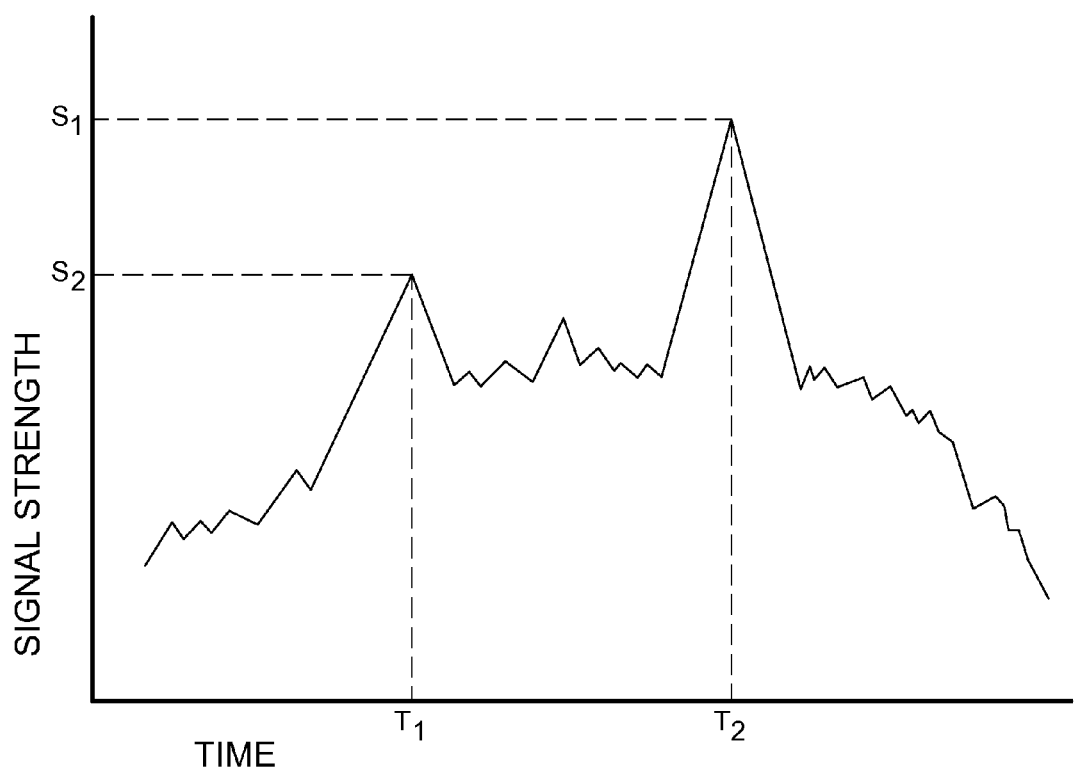
FIG. 5 is an exemplary waveform of a signal detected by the smartphone.

Various aspects of the invention are directed toward analyzing a signal for purposes of setting a baseline, as well as for comparing subsequent signals to the baseline. For instance, when the microphone 24 detects an acoustic signal, that signal may be associated with a waveform, as shown in FIG. 5. The acoustic signal detected by the microphone 24 not only includes sounds associated with opening and closing a vehicle door, the signal additionally includes other sounds such as sounds associated with nearby conversations, nearby traffic, etc. Each waveform may be unique due to the changing environment in which the vehicle doors are opened and closed. The waveform not only represents the opening and closing of the door, but also the concurrent environmental noises. As such, when the smartphone 10 is being trained, the smartphone 10 may require that the user repeat door opening and door closing until the smartphone 10 has detected a common signal pattern specifically associated with door opening and door closing. The detected signal may require filtering or other signal modification to focus in on the information associated with the desired event (e.g., opening the door, closing the door, starting the vehicle, etc.). For instance, the signal may be comprised of a carrier signal and an information signal, wherein the informational signal is associated with the desired event. Thus, the smartphone 10 may be capable of filtering or separating the informational signal from the carrier signal to detect the desired event.

According to one embodiment, the training module 43 may configure the smartphone 10 to recognize a first "peak" signal, $S_1$, associated with opening the door and a second "peak" signal, $S_2$, associated with closing the door, wherein the first and second peak signals occur within a couple seconds of each other, e.g., $T_2-T_1$. For instance, the entry detection module 47 may require that the first and second peak signals $S_1$, $S_2$ occur more than 0.5 seconds apart, but no more than 15 seconds apart. The duration of time between the peak signals $S_1$, $S_2$ may vary, and may be dependent on the agility of the user. For instance, more agile users may be able to enter their vehicle quicker, and thus, require a shorter duration between door opening and door closing, while less agile users may require more time between door opening and door closing. In this respect, the smartphone app may include pre-programmed agility modes with preset time differentials associated with the various agility modes. Alternatively, the smartphone app may allow the user to input the time differential between $T_1$ and $T_2$.

According to another embodiment, the smartphone app filters the signal through noise, vibration, and harshness (NVH) analysis.

Vehicle entry may also be determined by using a GPS system 22 on the smartphone 10 in connection with the position detection module 39 and entry detection module 47 of the smartphone app 31. In this regard, the position detection module 39 may configure the smartphone 10 enable tagging of the precise location of the vehicle 12 when the vehicle 12 is parked. The tagging may be achieved through user input (e.g., actuating a location tag button), or via other signals corresponding to the end of a driving experience, such as the smartphone 10 being disconnected from the vehicle's local wireless communication network (e.g., BLUETOOTH communication), or the microphone 24 detecting the engine being turned OFF, or the accelerometer 26 detecting the vibrations in the car subsiding or stopping, as is the case when the engine is turned OFF.

Once the parked vehicle location is known, the smartphone 10 can detect entry into the vehicle 12 when the smartphone 10 is returned to that tagged location. In this respect, the smartphone 12 may continuously or routinely monitor the current location of the smartphone 10 and compare the current location to the tagged location. When the current location is equal to the tagged location, or within a prescribed perimeter associated with the tagged location, e.g., within 10 feet of the tagged location, the smartphone 10 may conclude that the smartphone 10 has entered the area associated with the vehicle 12.

Entry of the vehicle 12 may also be detected via the short-range communication module 41, which may configure the smartphone 10 to associate the establishment of a communication link with the smartphone 10, or termination of a communication link from the smartphone 10 with entry or exit into the vehicle 12. For instance, in one embodiment, receipt of a wireless signal from a vehicle infotainment system, wireless key fob or some other wireless access control device associated with the vehicle may be indicative of entry into the vehicle. Entry may also be associated with detection of a wireless signal from the vehicle's wireless communication system or by detecting an electrical signal from the vehicle 12 when the smartphone 10 is connected to a vehicle outlet, such as a USB port, and the vehicle 12 is ON.

Exit from the vehicle 12 may be detected when any one of the aforementioned communication links is terminated, e.g., when the smartphone 10 is no longer in communication with the vehicle's wireless communication network, when the smartphone 10 is no longer connected to a vehicle outlet, etc. Exit from the vehicle 12 may also be detected based on other events associated with exit of the vehicle, such as the smartphone detecting a prescribed WiFi signal, such as the user's home WiFi or work WiFi. The entry detection module 47 may allow the user to program the smartphone 10 recognize one or more of the above-described events as being a trigger for entry into the vehicle 12 or exit from the vehicle 12. In this respect, the entry detection module 47 may also function as an exit detection module as well.

Figure 3:
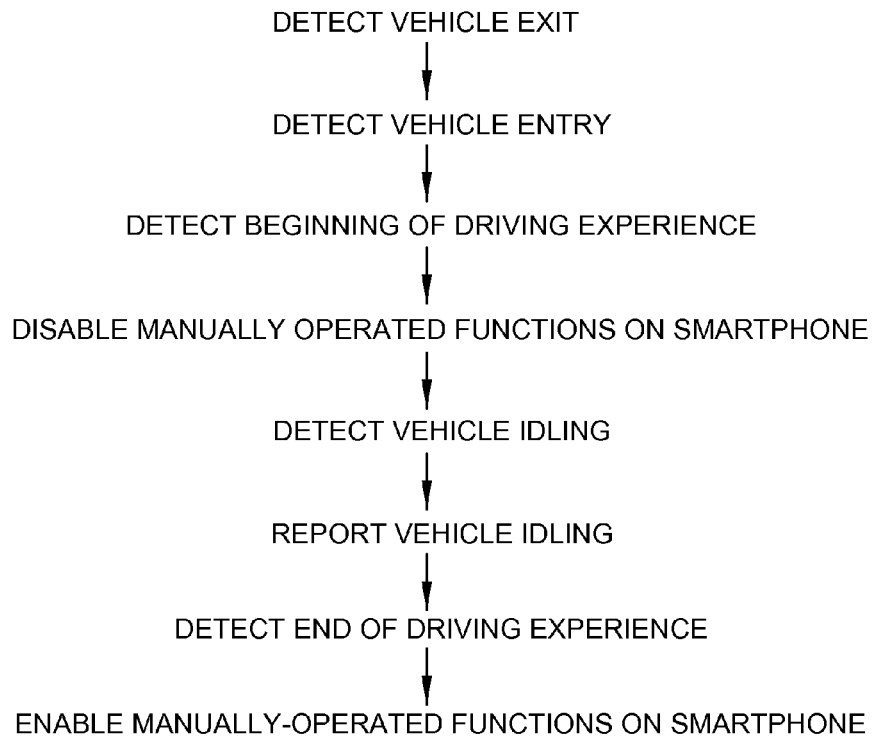
FIG. 3 is a flowchart of one particular embodiment of a method of detecting vehicle entry and vehicle idling.

Furthermore, detection of exit from the vehicle 12 may make it easier to detect subsequent entry into the vehicle 12. For instance, it may be difficult to distinguish the opening of a vehicle door from a similar sound, such as the opening of any other door (e.g., the front door of a house, etc.). Therefore, when the vehicle 12 is exited, the smartphone 10 may tag the GPS location such that when the smartphone 10 returns to that location (or within a prescribed detection zone associated with that location, such as 5-10 feet) and detects the opening of the door, the smartphone 10 will know that the vehicle 12 has been entered. Along these lines, FIG. 3 shows a flow chart, which begins with detecting exit of the vehicle 10, which is then followed by detecting entry of the vehicle 10. The detection of vehicle exit may set a first trigger (e.g., location), which must be met before detecting a second trigger (e.g., door opening). Once both triggers have been detected, the smartphone 10 may conclude that the vehicle 12 has been entered.

The smartphone app 31 may also include a vehicle operation module 45 which configures the smartphone 10 to detect various operational states of the vehicle 12, e.g., turning the engine ON, vehicle idling, vehicle motion, turning the engine OFF, etc. The vehicle operational status may be desired by a vehicle monitoring agent, such as a fleet manager, parent, insurance company, etc., or may be useful in controlling various functions on the smartphone 10, such as texting or other manually controlled functions.

Conventional smartphones 10 include a wide range of resources which may be employed for detecting the starting of the vehicle 12 or turning the engine ON. For instance, the smartphone's microphone 24 may be able to detect acoustic signals associated with turning the engine ON, while the accelerometer 26 may detect vibration signals associated with turning the engine ON. In this respect, the training module 43 and vehicle operation module 45 may work in concert with each other during initial setup of the smartphone 10 to "train" the smartphone 10 to recognize certain acoustic signals and/or vibrational signals associated with the starting of the vehicle 12. The smartphone app 31 may require that the engine is turned ON and OFF several times to allow the smartphone 10 to acquire enough data to confidently associate certain acoustic and vibrations signals with the engine being turned ON as well as the engine being turned OFF.

As discussed in more detail above in relation to using the microphone 24 to detect entry of the vehicle, various aspects of the invention are directed toward recognizing certain features in a signal or waveform detected by the microphone 24 and accelerometer 26. Along these lines, the microphone 24 and accelerometer 26 may detect several signals during the training phase in order to detect certain signal attributes associated with various operational milestones of the vehicle 12. For instance, the smartphone 10 may assign certain signal patterns, and/or signal frequencies, etc. in connection with the various operational milestones of the vehicle 12.

According to one embodiment, the smartphone 12 determines the engine being ON when both the acoustic frequency detected by the microphone and vibration frequency detected by the accelerometer are within assigned frequency ranges. As used herein, the engine being "ON" may be representative of the engine having been started, or the engine running while the vehicle is moving, or the engine running while the vehicle is stationary (e.g., vehicle idling). The frequency ranges may be assigned during the training phase, wherein the smartphone 10 detects the engine turning ON several times and assigns a minimum frequency and a maximum frequency based on the detected frequencies to establish a frequency range associated with the vehicle engine being ON. Alternatively, the smartphone 10 may be configured to assign a particular tolerance range to a single detected frequency such that any frequency detected within that tolerance range will be associated with turning the engine ON. As another alternative, the smartphone 10 may be configured to assign a particular tolerance range to a single detected frequency pattern within a frequency range.

In a preferred embodiment, the smartphone 10 uses information collected from both the accelerometer 26 and the microphone 24 to make a determination as to the engine being turned ON. However, it is also contemplated that in other embodiments, the accelerometer 26 and microphone 24 may be used independent of one another during an analytics period.

According to another embodiment, the smartphone 10 may also detect the starting of a vehicle 12 based on an electrical signal received from the vehicle 12. In this regard, the smartphone 10 may be plugged into the vehicle 12 via a charging cable or the like, which is connected into a cigarette lighter or a USB port, or other electrical outlets on the vehicle 12. When the vehicle 12 starts, and the charging system is engaged and properly operating, a small ACV ripple can be found riding on the DCV of the vehicle's battery/charging system. This ripple can indicate that that the vehicle 12 has started or is running. Furthermore, there may be a large drop in DC voltage when the starter is engaged.

Once the smartphone 10 detects that vehicle 12 has started, several other functions performed by the smartphone 10 may be initiated. According to one embodiment, the smartphone app 31 may operate as a sensory communications regulator wherein texting or other manually controlled functionality is disabled when the smartphone 10 detects that the vehicle 12 has been turned ON. For instance, the smartphone app may restrict the smartphone 10 to disable manually answering a phone call received by the smartphone 10. All calls may be answered either via voice command, or using control inputs located on the vehicle 12, such as a phone answering button located on the steering wheel. The smartphone app 31 may also disable games, social media apps, such as FACEBOOK and INSTAGRAM, as well as email access when the smartphone 10 detects that the vehicle 12 is ON. Conversely, the vehicle 12 may enable access to navigation programs as well as music programs including music stored on the smartphone 10 as well as streaming music. Control of the various manually operated functions may be executed by the manual function control module 49. According to one embodiment, the smartphone 10 may disable communication over a cellular communication network when the smartphone 10 detects the vehicle has started. Disabling such communications may be effectuated by transitioning the smartphone 10 into a preset limited operations mode.

Although certain embodiments may regulate operation of the smartphone 10 based on the smartphone 10 determining that the vehicle 12 has been turned ON, other implementations of the invention may enable or disable such functionality not only when the vehicle 12 been turned ON, but also when the vehicle 12 is also in motion. In this respect, the smartphone 10 may use the microphone 24, the accelerometer 26 and GPS module 22 to detect motion of the vehicle 12. Once the vehicle 12 has been placed in motion, the manually controlled functionality on the smartphone 10 may be disabled while other functionality may remain accessible and operable.

According to one embodiment, the smartphone app 31 may restrict certain functionality by simply transitioning the smartphone 10 from a normal operational mode into a preset limited operations mode in order to disable texting and other communication functions. In another embodiment, the smartphone app 31 allows the user to selectively choose which functions or applications are disabled when the smartphone 10 either detects the engine being ON or movement of the vehicle 12.

According to one embodiment, the smartphone disabling feature is used in connection with a dongle 38 (see FIG. 1) which is plug connectable into an OBD II port (e.g., a vehicle diagnostic port) located on the vehicle 12. The dongle 38 receives communication from the vehicle's ECU 20 during operation of the vehicle 12. Therefore, the dongle 38 may be able to determine that the vehicle 12 has been turned ON and that the vehicle 12 is moving by looking at the operational data, such RPM or speed data, received from the ECU 20. The dongle 38 may also include its own GPS module for detecting movement of the vehicle 12.

According to one embodiment, the dongle 38 is capable of communicating wirelessly with a paired smartphone 10 via a local wireless network, such as a BLUETOOTH™ network. Therefore, when the dongle 38 determines that the vehicle 12 has been turned ON or is moving, the dongle 38 may communicate a signal to the smartphone 10 to disable certain functionality, as described above.

It is understood that any given vehicle 12 may be carrying more than one passenger, and thus, more than one smartphone 10 may be located in the vehicle 12. Therefore, one aspect of the invention is directed toward distinguishing the driver's smartphone from the passenger's smartphone. This distinction may be made by utilizing the unique wireless communication identifier's associated with the various components in the system. For instance, the dongle 38, the smartphone 10, and the vehicle's local wireless communication network may each have unique wireless ID's. Furthermore, the driver's smartphone 10 may be programmed to enable the smartphone 10 to be automatically paired with the dongle 38 and/or the vehicle's local communication network when the smartphone 10 is located in the vehicle 12. Conversely, the passenger's smartphone may not recognize the unique wireless ID's of the dongle 38 and/or the vehicle's local wireless network, and thus, the passenger's smartphone may not be automatically paired therewith, even though the passenger's smartphone is within wireless range of both networks. Thus, when a smartphone 10 recognizes a defined wireless ID, the various functions described herein, e.g., operational status detection, texting disabling, etc., may be actuated, while a smartphone which does not recognize the wireless ID(s) may operate in a conventional sense.

When the vehicle 12 stops moving or has been turned OFF, the smartphone 10 may be configured to enable the functions or applications which were previously disabled during the operation of the vehicle 12. The same resources which were used for determining that the vehicle 12 was turned ON or started moving can also be used to determine that the vehicle 12 has stopped or has been turned OFF. In this regard, the smartphone 10 may detect such termination of the driving experience via the microphone 24, accelerometer 26, GPS module 22, electrical input (or lack thereof), via a signal from a corresponding dongle or via a determination of the local communication network in the vehicle 12.

According to another embodiment, the smartphone app 31, specifically the vehicle operation module 45, configures the smartphone 10 to detect vehicle idling during operation of the vehicle 12. The detection of vehicle idling may be desirable for many different purposes. For instance, a fleet manager has a significant interest in knowing whether his employed drivers are simply resting in their idling vehicle 12, or whether the employees are driving. It is also contemplated that the idling information may be representative of a serious traffic accident which could warrant rerouting for other drivers as well as the driver experiencing the traffic backup. Rerouting may also be required if traffic is slowed, which may be detected via a GPS module 22 located on the smartphone 10. As such, a reroute module 40 may be incorporated into the smartphone 10 as part of the smartphone app, or alternatively, the remote monitoring station 34 may have access to a reroute module 40. The reroute module

40 may be capable of calculating an updated navigational route based on current traffic conditions, including idling information received from one or more vehicles. The smartphone app 31 may compare the detected idling information with geographic information (e.g., maps, driving route information, etc.) to determine where the idling is occurring. For instance, if the idling is occurring in a parking lot, there may be no need to generate a new route. However, if the idling is detected on a highway or street, rerouting may be required.

According to one embodiment, the smartphone 10 utilizes the microphone 24 and the accelerometer 26 located on the smartphone 10 to detect vehicle idling. The microphone 24 is utilized to record and establish the baseline ambient cabin pressure associated with vehicle idling. The baseline is used as reference for a comparison to known characteristic idling and off idling frequency/decibel levels. Instantaneous changes in ambient cabin pressure, known as Instantaneous Sound Pressure, can be recorded and compared to the established baseline. These measurements are used to determine KOEO (Key On Engine Off), to KOER (Key On Engine Running). A baselines cabin ambient sound pressure is established and the variance above standard references values triggers an event. Once an event has been established, the frequency of the noise is compared against a known characteristic frequency database to confirm the vehicle has started and is running. The baseline is used as a reference for comparison to known characteristic idling and off-idling frequency/decibel data.

The accelerometer 26 is used to record the varying forced disturbances applied to the vehicle's structure such as those disturbances imparted by the engine or motor during operation thereof. These forces may be periodic or study state vibrational inputs that are recorded and compared against a known characteristic frequency/decibel level. This comparison identifies vehicle vibration versus random inputs such as occupant movement or over the road vibrations.

The microphone 24 may also be adapted to detect vehicle idling based on environmental noise patterns. For instance, the environmental noise patterns may be associated with the engine running at an idling RPM.

Figure 6:
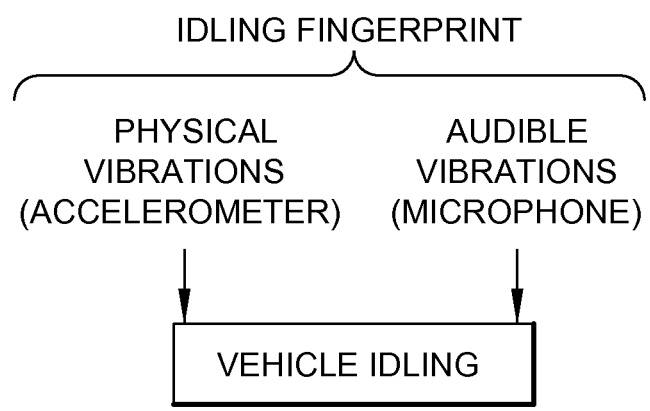
FIG. 6 is a schematic diagram illustrating various inputs which may be used for detecting vehicle idling.

According to one embodiment and referring now to FIG. 6, the smartphone 10 receives the signals from the microphone 24 and accelerometer 26 and compares those received signals with stored acoustic and acceleration signals corresponding to vehicle idling of a predetermined vehicle 12. In other words, each vehicle 12 may have a specific "idling fingerprint" associated with unique acoustic signals and accelerations signals.

The smartphone 10 may be configured to measure the time during which a vehicle idles and report that time to a monitoring station 34. In this respect, the smartphone 10 may be programmed to define a prescribed vehicle idling threshold such that when the vehicle idling time meets or exceeds that vehicle's idling threshold the smartphone 10 generates and transmits a signal to a remote monitoring station/server to alert the remote station/server 34 of the idling.

According to one embodiment, the signals received by the microphone 24 and or accelerometer 26 may be similar for both vehicle idling as well as vehicle moving. As such, the determination of whether the vehicle is idling or moving may be made based on GPS information. More specifically, if the GPS information indicates a change in position, then the vehicle is moving. In contrast, if the GPS information indicates that the position has not changed, then the vehicle is idling. The smartphone app may configure the smartphone 10 to allow for a certain amount of non-movement before a determination of idling is made. For instance, if the GPS information shows non-movement for a period of greater than or equal to two minutes, a determination of idling may be made, whereas non-movement of less than two minutes may be inconclusive of idling. Of course the duration of non-movement which triggers a determination of idling may be any value.

The GPS information may also be useful for roughly tracking the speed of the vehicle. In particular, the speed may be derived by noting the rate of positional change according to the GPS information, and dividing that by the time (e.g., distance/time). The speed information may be charted to provide an easy visual of the user's speed. This information may be useful to a parent or fleet manager to ensure the driver stays below a certain speed threshold.

The foregoing discussion describes the use of a smartphone 10 in connection with the operation of a vehicle 12. As described above, the smartphone 10 may detect several milestones associated with a driving experience, starting from the opening of the vehicle door at the beginning of the driving experience to the closing of the vehicle door at the end of the driving experience. So long as the smartphone 10 is operational and the smartphone app is running, the various functions described above may be performed. However, in the event the smartphone 10 is OFF or the smartphone app is not running at the beginning of the driving experience, the smartphone app may be configured to automatically determine the current driving conditions when the smartphone 10 and app have been turned ON. For instance, if battery in the smartphone 10 dies, and the user plugs the smartphone 10 into a power cord in a running vehicle 10, the smartphone app may configure the smartphone 10 to detect the current driving conditions (idling, moving, etc.) once the smartphone 10 has started up and the app is running.

According to another embodiment, the onboard resources of the smartphone 10 may be used to track mileage during a driving experience, as well as the location of start and end of the driving experience. These capabilities may be particularly suited for tracking and reporting mileage for tax purposes or other mileage reimbursement purposes, such as reimbursement through the user's employer.

In the past, mileage information for reimbursement or tax reports was typically tracked via hand-written notes, which was very cumbersome and time consuming. Furthermore, conventional hand-written tracking methods were prone to abuse and mistake, as there was not an easy way to confirm and verify the authenticity and accuracy of such information.

In order to address the deficiencies associated with the conventional mileage tracking methods, various aspects and implementations of the present invention are directed toward more easily tracking mileage for purposes of submitting a reimbursement report or tax report in accordance with mileage reporting rules or tax reporting rules. In particular, such systems may be configured to automatically sort mileage that qualifies as being tax-deductible or reimbursable from mileage that is not tax-deductible or reimbursable. For instance, according to certain tax codes, the mileage traveled between an individual's home and office typically does not qualify as mileage which may be deducted for tax purposes. On the other hand, mileage between the individual's home and a client's office, or between the individual's office and a client's office may be deduced for reported for tax deducting purposes. Other deductible mileage may include mileage related to moving, charitable functions, job search, and educational purposes. For additional information regarding federal tax rules and guidelines related to deducting expenses related to the operation of a vehicle, please see www.irs.gov, as well as Section 274(d) of the IRS code and Section 1.274-5 of the Income Tax Regulations. It is understood that employers may also provide mileage reimbursement for certain trips, which may or may not be consistent with the tax codes.

Figure 7:
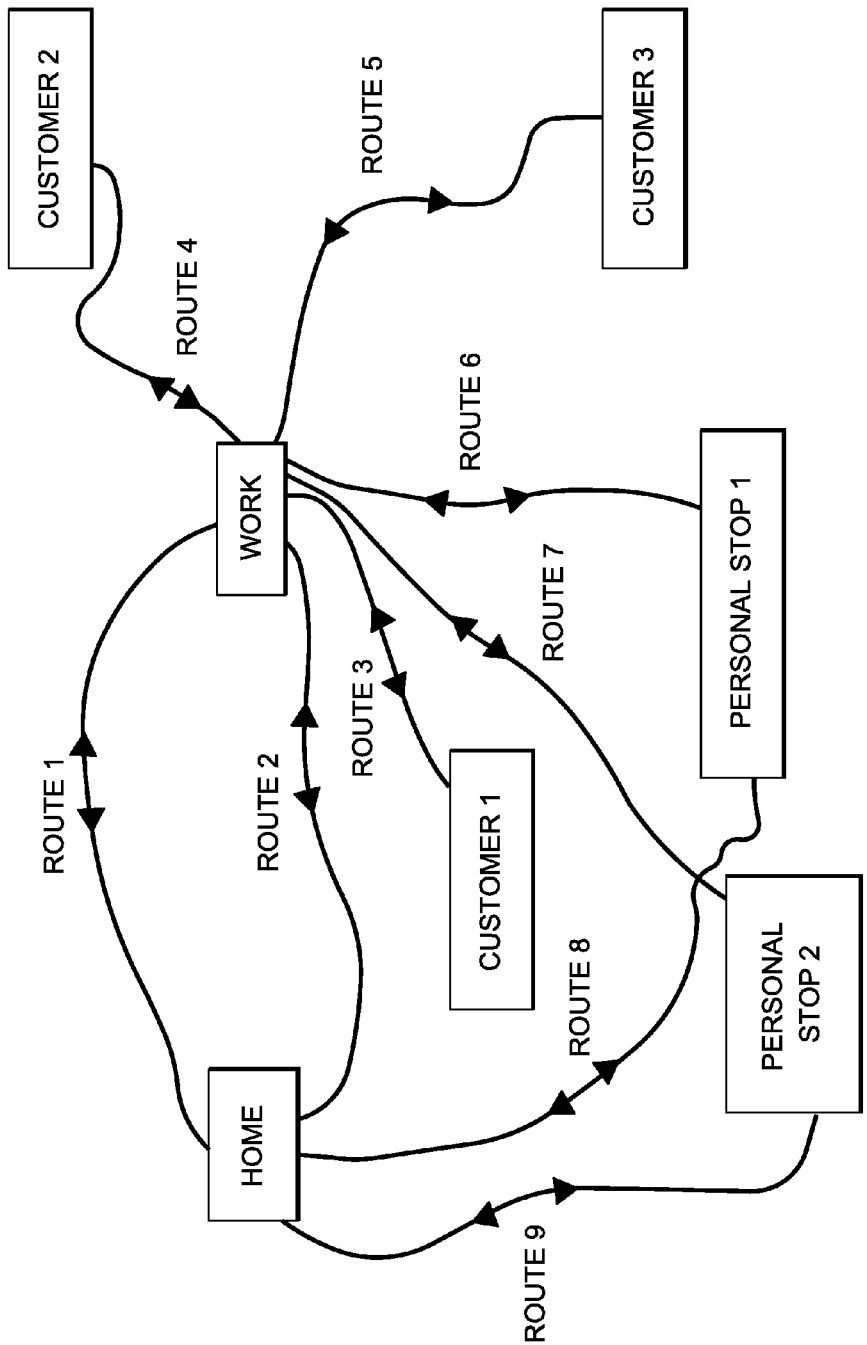
FIG. 7 is a map showing positional information associated with a vehicle.

According to one embodiment, the smartphone 10 may be configured by a user to allow the user to selectively tag "locations" or destinations that the user regularly visits, such as the user's home, office/work, various customers, restaurants, fitness center, etc. Furthermore, the smartphone 10 additionally allows the user to categorize the preset destinations as being "qualifying" destinations or "non-qualifying" destinations for purposes of tax reporting or reimbursement. As shown in FIG. 7, the "qualifying locations" may include WORK, CUSTOMER 1, CUSTOMER 2, and CUSTOMER 3, while the "non-qualifying locations" include PERSONAL STOP 1, and PERSONAL STOP 2. Therefore, when the user travels between two "qualifying" destinations, the smartphone 10 will automatically categorize the mileage between those destinations as being tax-deductible or reimbursable mileage. Conversely, if the user travels between two non-qualifying destinations or between one qualifying destination and one non-qualifying destination, the smartphone 10 may automatically categorize the mileage between those destinations as being non-deductible or non-reimbursable mileage. The smartphone 10 may additionally include an override capability to allow a user to disregard the aforementioned default settings. For instance, the mileage between the user's office and a restaurant the user frequents personally may have a default categorization as being non-deductible. However, if the user drives from the office to the restaurant to meet with a client, the user may override the default setting on a one-time basis, which causes the smartphone 10 to categorize the mileage for that particular trip as being deductible mileage. Of course, the override functionality may also allow the user to change the default from deductible to non-deductible as well.

The tagging of locations may be done during the initial setup of the mileage-tracking system, which may be implemented as part of the smart-phone application. For instance, the setup may ask the user to enter the address of various locations the user frequently visits, such as the user's home(s), office(s), fitness center(s), restaurant(s), mall(s), client(s), church(es), etc. The initial setup may be conducted directly on the smartphone 10 or via a website associated with the smartphone application.

In addition to the tagging done during the initial setup, the smartphone 10 may also allow tagging as the system is used. In particular, when the user drives to an untagged location, the smartphone 10 may allow the user to tag the location. The smartphone 10 may be configured to automatically solicit the tagging from the user when the beginning or end of the driving experience occurs in an untagged location. For instance, when the start or end of the driving experience (or several minutes after the driving experience, so as not to interfere with the user's driving) occurs at a location that has not been previously tagged, the smartphone 10 may be configured to generate an alert to inquire into whether the user desires to tag that location. The alert may include an audible signal, as well as a display on the smartphone 10, such as, "Do you want to tag this location?" If the user does want to tag the location, the system may allow the user to name that location. If the user does not want to tag the location, the user may be given the option of continuing the tracking functionality with the location being referred to generically, i.e., LOCATION 1. Alternatively, if the user does not want to tag the location, the user may be given the option to turn the mileage tracking functionality off. The system may also be configured to allow the user to initiate the tagging without solicitation from the smartphone 10.

Therefore, when the user completes a trip between two locations for the first time, the smartphone 10 may generate an alert to inquire into whether the user wants to categorize or label that trip. Once the locations have been tagged and the trip is categorized, the system may automatically track and categorize the trip without any input by the user. For instance, if the user has tagged his OFFICE and CLIENT, and categorized a trip therebetween as a WORK trip, then the system 10 will default to tracking every trip between the OFFICE and CLIENT. If for any reason the user does not want the mileage tracked, the user may enter a signal (i.e., actuate an override button), which overrides the default setting.

In addition to tagging locations, the system may further be configured to categorize trips between certain destinations based on categories assigned by the user. For instance, the user may assign trips between the office and various clients as a "WORK" category. The user may further assign trips between the home and various entertainment destinations, i.e., theater, as an "ENTERTAINMENT" category, while trips between the home and a relative's house may be categorized as 'PERSONAL." In this regard, the names of the locations and categories may be defined by the user, although the system may include pre-defined category titles/headings which may be used by the user.

The mileage tracking system mitigates the burden of tracking one's mileage by hand, and allows the user's smartphone to automatically track the mileage information when the user completes a trip. The mileage information stored by the system may be printed in a report which may provide documentation or information needed to corroborate the corresponding reimbursements or deductions. Furthermore, the smartphone application may additionally allow the mileage information to be imported into a tax reporting form, or the like.

For additional information related to using the smartphone 10 to track mileage, please see U.S. patent application Ser. No. 14/102,287 entitled Smartphone Based Telematics Applications, the contents of which are expressly incorporated herein by reference.

Various aspects of the invention may also be directed toward a user interface or setup menu which allows the user to selectively configure various macros, or similar operating instructions, which may operate on the smartphone 10 as part of the above-described system. Along these lines, while the preferred embodiment of the smartphone application is a self-learning application which minimizes the amount of input required by the user, such as distinguishing between an electric vehicle and a conventional gas vehicle, the user interface may appear on the smartphone's display screen and allow the user to make one or more selections for configuring the smartphone 10 and the application running on the smartphone 10. For instance, the user interface may allow the user to make the aforementioned selection between electric, hybrid or gas vehicles. Along these lines, it is understood that the sensing parameters, e.g., noises and vibrations associated with conventional gas vehicles may differ from the sensing parameters associated with electric vehicles. As such, the software loaded onto the smartphone 10 may have certain sensing parameters associated with the different classes of vehicles, and by selecting the specific class of vehicle operated by the user, the smartphone 10 may be configured to detect inputs within the specific sensing parameters associated with the selected vehicle. The user interface may also allow the user to make additional selections which may be associated with the acoustic or vibrational characteristics of the vehicle, such as the transmission type (automatic/manual), number of doors, presence/absence of a sunroof, whether the vehicle is a convertible, etc. The user may be able to make selections based on the type of driving that is to be expected, e.g., city driving or highway driving.

The user interface may also allow the user to select which resources on the smartphone 10 should be used for detecting certain milestones associated with the driving experience. For instance, the user may want to detect vehicle entry using the microphone only, and vehicle idling using the microphone and accelerometer. The software downloaded onto the smartphone 10 may include a default setting which configures the smartphone 10 to use prescribed hardware for performing certain functions, although the user interface may allow a user to deviate from the default setting to provide additional flexibility for more advanced applications.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A non-transitory computer readable storage medium having a set of computer executable instructions that, when executed by a handheld communication device cause the handheld communication device to:
    sense acoustic signals during entry of a user into a vehicle, the sensed acoustic signals including ambient noise and desired noise;
    filter the ambient noise from the desired noise to identify a filtered signal pattern;
    activate operational status detection hardware in the handheld communication device when the filtered signal pattern matches a stored signal pattern;
    detect operational data during operation of the vehicle using the activated operational status detection hardware;
    receive vehicle characteristic information associated with at least one feature of the vehicle;
    identify sensing parameters associated with the received vehicle characteristic information;
    compare the detected operational data to the identified sensing parameters to determine the operational status of the vehicle; and
    where the defected operational data is determined to indicate that the vehicle is idling, measure an idling time corresponding to duration of vehicle idling;
    compare the measured idling time to an idling time threshold; and
    generate an alert signal when the measured idling time exceeds the idling time threshold.

2. The non-transitory computer readable storage medium recited in claim 1, wherein the set of computer executable instructions further cause the handheld communication device to detect starting of the vehicle based on acoustic signal and acceleration signals detected by the handheld communication device.

3. The non-transitory computer readable storage medium recited in claim 1, wherein the set of computer executable instructions further causes the handheld communication device to:
    detect a vehicle engine being ON; and
    disable at least one manually operated function of the handheld communication device in response to detection of the vehicle engine being ON.

4. The non-transitory computer readable storage medium recited in claim 3, wherein the detection of the vehicle engine being ON includes detection of starting of the engine.

5. The non-transitory computer readable storage medium recited in claim 3, wherein the detection of the vehicle engine being ON includes detection of engine idling.

6. The non-transitory computer readable storage medium recited in claim 3, wherein the set of computer executable instructions further causes the handheld communication device to:
    detect a vehicle engine transitioning from being ON to being OFF; and
    enable the at least one manually operated function of the handheld communication device in response to detection of the vehicle engine transitioning from being ON to being OFF.

7. The non-transitory computer readable storage medium recited in claim 1, wherein the set of computer executable instructions further causes the handheld communication device to:
    detect a vehicle engine being ON; and
    transition the handheld communication device into a preset mode when the vehicle engine is detected as being ON.

8. The non-transitory computer readable storage medium recited in claim 1, wherein the set of computer executable instructions further causes the handheld communication device to detect exit of the handheld communication device from the area associated with the vehicle.

9. The non-transitory computer readable storage medium recited in claim 1, wherein the set of computer executable instructions further causes the handheld communication device to calculate an updated navigational route when the measured idling time exceeds a preset threshold.

10. The non-transitory computer readable storage medium recited in claim 1, wherein the vehicle characteristic information is associated with at least one of: a gas engine, an electric engine, and a hybrid engine.

11. The non-transitory computer readable storage medium recited in claim 1, wherein the vehicle characteristic information is received from a user.

12. A non-transitory computer readable storage medium having a set of computer executable instructions that, when executed by a handheld communication device cause the handheld communication device to:
    receive vehicle characteristic information associated with at least one feature of a vehicle;
    identify sensing parameters associated with the received vehicle characteristic information;
    operate in a training mode to sense acoustic signals and acceleration signals based on the identified sensing parameters to recognize an acoustic signal and an acceleration signal associated with idling of a vehicle and store the recognized acoustic signal and acceleration signal on the handheld communication device;
    operate in a detecting mode to detect an acoustic signal and an acceleration signal generated by the vehicle;
    compare the detected acoustic signal and acceleration signal from the detecting mode with the stored acoustic and acceleration signals corresponding to vehicle idling from the training mode to detect vehicle idling; and measure an idling time corresponding to duration of vehicle idling;

compare the measured idling time to a prescribed idling time threshold; and generate an alert signal when the measured idling time exceeds the prescribed idling time threshold.

13. The non-transitory computer readable storage medium recited in claim 12, wherein the set of computer executable instructions further cause the handheld communication device to communicate the alert signal to a remote server.

14. The non-transitory computer readable storage medium recited in claim 12, wherein the set of computer executable instructions further cause the handheld communication device to:

detect a vehicle engine being ON; and activate vehicle detection hardware located on the smartphone in response to detection of the vehicle engine being ON.

15. The non-transitory computer readable storage medium recited in claim 14, wherein the set of computer executable instructions further cause the handheld communication device to detect the vehicle engine being ON based on an electrical signal received by the handheld communication device.

16. The non-transitory computer readable storage medium recited in claim 14, wherein the set of computer executable instructions further cause the handheld communication device to detect the vehicle engine being ON at least partially based on a detected acoustic signal.

17. The non-transitory computer readable storage medium recited in claim 14, wherein the set of computer executable instructions further cause the handheld communication device to detect the vehicle engine being ON at least partially based on a detected acceleration signal.

18. The non-transitory computer readable storage medium recited in claim 12, wherein the set of computer executable instructions further cause the handheld communication device to:

detect a vehicle engine being ON; and disable at least one manually operated function of the handheld communication device in response to detection of the vehicle engine being ON.

19. A process of detecting an operational status of a vehicle using a handheld communication device, the process comprising the steps of:

detecting entry of the handheld communication device into an area associated with the vehicle by:

sensing acoustic signals during entry of a user into the vehicle, the sensed acoustic signals including ambient noise and desired noise; and filtering the ambient noise from the desired noise to identify a filtered signal pattern;

activating idling detection hardware located on the handheld communication device in response to detection of entry of the hand held communication device into the area associated with the vehicle;

detecting operational data of the vehicle using the idling detection hardware;

receiving vehicle characteristic information associated with at least one feature of the vehicle;

identifying sensing parameters associated with the received vehicle characteristic information;

comparing the detected operational data to the identified sensing parameters to determine the operational status of the vehicle; and where the detected operational data is determined to indicate that the vehicle is idling, measuring an idling time corresponding to duration of vehicle idling;

comparing the measured idling time to a prescribed idling time threshold; and generating an alert signal when the measuring idling time exceeds the prescribed idling threshold.

20. The process recited in claim 19, further comprising the steps of:

detecting a vehicle engine being ON; and disabling at least one manually operated function of the handheld communication device in response to detection of the vehicle engine being ON.

* * * * *